(12) United States Patent
Arnott et al.

(10) Patent No.: US 8,949,927 B2
(45) Date of Patent: Feb. 3, 2015

(54) SYSTEM AND METHOD FOR SELECTION OF SECURITY ALGORITHMS

(75) Inventors: Robert Arnott, Tokyo (JP); Francesca Serravalle, Tokyo (JP); Jagdeep Singh Ahluwalia, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 698 days.

(21) Appl. No.: 12/734,393

(22) PCT Filed: Oct. 27, 2008

(86) PCT No.: PCT/JP2008/069834
§ 371 (c)(1),
(2), (4) Date: Apr. 29, 2010

(87) PCT Pub. No.: WO2009/057730
PCT Pub. Date: May 7, 2009

(65) Prior Publication Data
US 2010/0263021 A1    Oct. 14, 2010

(30) Foreign Application Priority Data

Oct. 31, 2007   (GB) .................................. 0721337.4

(51) Int. Cl.
*H04L 29/06* (2006.01)
*H04W 12/08* (2009.01)

(52) U.S. Cl.
CPC ............... *H04W 12/08* (2013.01); *H04L 69/24* (2013.01); *H04L 63/20* (2013.01); *H04L 63/205* (2013.01)
USPC ..................... 726/1; 726/2; 380/255; 455/410

(58) Field of Classification Search
USPC ........... 726/1, 2; 380/255, 270, 272; 455/410, 455/411
See application file for complete search history.

(56) References Cited

U.S. PATENT DOCUMENTS 6,466,779 B1 * 10/2002 Moles et al. .................. 455/410
7,213,144 B2 * 5/2007 Faccin et al. .................. 713/153

(Continued)

FOREIGN PATENT DOCUMENTS

| CN | 101170811 A | 4/2008 |
| CN | 101207479 A | 6/2008 |

(Continued)

OTHER PUBLICATIONS

Korean Office Action dated Nov. 30, 2011, with English translation.
Korean Office Action dated Apr. 11, 2013 with partial English translation.
3GPP TS 23.401 V1.3.0, $3^{rd}$ Generation Partnership Project; Technical Specification Group Services and System Aspects; GPRS Enhancements for E-UTRAN access (Release 8), Oct. 24, 2007, pp. 1-136.

(Continued)

*Primary Examiner* — Saleh Najjar
*Assistant Examiner* — Peiliang Pan
(74) *Attorney, Agent, or Firm* — McGinn IP Law Group, PLLC

(57) ABSTRACT

There is described a method and apparatus for managing security for a connection between a user device and a communications network comprising at least one base station and a core network. In one embodiment, the method includes receiving at the core network security capability information for the user device connecting to the communications network. Security capability information for the base station is then obtained from memory or from the base station itself. The security capability information for the user device and the security capability information for the base station is then processed in the core network to select a security policy for a connection between the user device and the base station and the selected security policy is transmitted to the base station.

30 Claims, 7 Drawing Sheets

(56) References Cited

U.S. PATENT DOCUMENTS

| | | | |
|---|---|---|---|
| 7,272,123 B2* | 9/2007 | Wall | 370/331 |
| 7,571,317 B1* | 8/2009 | Vilhuber | 713/161 |
| 8,019,886 B2* | 9/2011 | Harrang et al. | 709/232 |
| 8,165,576 B2* | 4/2012 | Raju et al. | 455/422.1 |
| 2003/0033518 A1 | 2/2003 | Faccin et al. | |
| 2005/0063400 A1 | 3/2005 | Lum | |
| 2005/0262569 A1 | 11/2005 | Shay | |
| 2006/0030294 A1* | 2/2006 | Funnell et al. | 455/410 |
| 2006/0059551 A1* | 3/2006 | Borella | 726/13 |
| 2008/0005780 A1 | 1/2008 | Singleton | |
| 2008/0080423 A1* | 4/2008 | Kolding et al. | 370/329 |

FOREIGN PATENT DOCUMENTS

| | | | |
|---|---|---|---|
| WO | WO 03/029941 A2 | 4/2003 | |
| WO | WO 2005/111841 A3 | 11/2005 | |
| WO | WO 2007/110094 A1 | 10/2007 | |

OTHER PUBLICATIONS

Chinese Office Action dated Jan. 7, 2013.

3GPP TR 33.821, Technical Specification, $3^{rd}$ Generation Partnership Project; Technical Specification Group Services and System Aspects; "Rationale and Track of Security Decisions in Long Term Evolved (LTE) RAN/3GPP System Architecture Evolutions (SAE)", (Release 8), V01.3.0(May 2007), pp. 65-71.

Nokia Siemens Networks, "Security Algorithms Negotiation in SAE/LTE Networks", 3GPP TSG SA WG3 Security—SA3#46, S3-070100, Beijing, China, Feb. 13-16, 2007 URL, http://www.3gpp.org/ftp/tsg_sa/wg3_security_TSGS3_46_Beijing/Docs/S3-070100.zip.

Nokia Siemens, "Update on Algorithms Selection", 3GPP TSG SA WG3 Security SA3#48, S3-070522, Jul. 13, 2007. URL, http://www.3gpp.org/ftp/tsg_sa/wg3_security/TSGS3_48_Montreal/Docs/S3-070522.zip.

* cited by examiner

SYSTEM AND METHOD FOR SELECTION OF SECURITY ALGORITHMS

TECHNICAL FIELD

The present invention relates to the selection of security algorithms in telecommunications networks, particularly but not exclusively networks operating according to the 3GPP standards or equivalents or derivatives thereof.

BACKGROUND ART

In telecommunications networks, connections are established between components or nodes in the network. In particular, connections are established between user equipment (UE), such as mobile communication devices, and base station (eNodeB) components, at least in part over a wireless interface.

Wireless connections are particularly vulnerable to interception and potentially hostile third parties may attempt to obtain information from communications transmitted over these connections. Communication over the wireless connections is secured using an agreed algorithm. The algorithm to use for communication over a particular connection is agreed between the parties to the connection, such as the eNodeB and UE components, when the connection is established.

Connections may be established when a UE connects to an eNodeB in an attachment process, for example when a mobile device is switched on, or when a UE transfers from one eNodeB to a different eNodeB in the network in a handover process.

During attachment or handover, the eNodeB to which the UE is connecting determines the security capabilities of the UE. Based on this information and its own security capabilities, the eNodeB selects and defines the security algorithm for traffic on the connection. However, this requires a high level of trust of the eNodeB component by the network and by the connecting user, which may be problematic particularly for a roaming user. Selection of an inappropriate or weak security algorithm by the eNodeB may lead to poor security for a connecting user and may provide a point of weakness in the security of the network as a whole.

DISCLOSURE OF INVENTION

The various acronyms applicable in the telecommunications network will of course be familiar to those skilled in the art, but a glossary is appended for the benefit of lay readers. Although for efficiency of understanding for those of skill in the art the invention will be described in detail in the context of a E-UTRAN system, the principles of the identifier system can be applied to other systems, e.g. 3G, CDMA or other wireless systems in which base station components, such as eNodeB components, communicate with each other or with other devices, such as gateway devices, in the telecommunications network, with the corresponding elements of the system changed as required. The present methods and systems may also be implemented in wireless local area networks (WLANs) or other local or wide area networks (LANs or WANs)

According to one aspect there is provided a method of managing security for a connection between a user device and a communications network comprising at least one base station and a core network, the method comprising:

receiving at the core network security capability information for the user device connecting to the communications network;

obtaining security capability information for the base station; processing in the core network the security capability information for the user device and the security capability information for the base station to select a security policy for a connection between the user device and the base station; and transmitting the selected security policy to the base station.

Advantageously, the method enables selection of the security policy to be controlled by the core network. Receiving security capability information for the base station enables this selection to be made taking into account the capabilities of the base station.

As noted above, while it can be efficient for the eNodeB to select the security algorithm for communication to the UE, this method has drawbacks. In particular, the eNodeB may not select the most secure algorithm available or the algorithm selected may not accord with the security policies of the core network. Therefore, a connecting user must trust the eNodeB to implement an appropriate security policy.

Selection of the security policy by the core network as claimed provides a greater level of trust for connecting users and may enable optimisation of security across the network.

In a preferred embodiment, the method further includes obtaining security policy information for the core network and selecting a security policy based on the security policy information for the core network. The method therefore allows the selection of the security policy to take into account any requirements or preferences of the core network. For example, the core network may allow connections using a limited number of security policies or may have one or more preferred security policies.

The security policy may be selected from a prioritised list of security policies, which may be defined by the core network or composed by the device that is handling the security policy selection, for example based on prior experience of security policies used by base stations in the network.

In one embodiment, prior to receiving security capability information for the user device, the core network receives security capability information for each of a plurality of base stations in the core network.

Preferably, the security capability information is received following establishment of a connection between a base station and the core network. Hence when a new base station, such as an eNodeB, connects to a core network component, such as a gateway, the base station transmits details of its security capability information to the core network. The information may then be stored in a database in the core network, for example in a context associated with each base station. In this way, the core network can obtain information relating to the security capabilities of each component connected to it before users attempt to set up connections via the base stations. This information can then be obtained from memory and used in determining a security policy for a requested connection.

Advantageously, this method imposes the minimum signalling overhead when a connection to a user is set up, since the core network is already aware of the security capabilities of the base station. Therefore, no further messages are required to determine security capabilities of the base station at this time, enabling faster connection set up.

In this embodiment, the method may further comprise receiving security capability information for a base station and updating a database to store the security capability information. Security capability information is therefore stored for use in the event that user equipment requests connection to that base station.

The method may further include receiving a notification regarding transfer of the user device from a source base station to a target base station;

obtaining security capability information for the target base station;

determining whether a change in the security policy is required for connection to the target base station; and transmitting the selected security policy to the target base station.

In an alternative embodiment, the method further comprises receiving security capability information from a base station. The information may be received as part of an attachment request message or on request from the core network component.

This embodiment provides the advantage that the core network does not need to maintain a database of the security capabilities of each base station component. Rather, the core network obtains the necessary information only when it needs to use this information.

In this embodiment, security capability information is obtained from base stations after a user has requested the establishment of a connection via that base station. In this embodiment, it is not necessary for the core network component to store security capability information but it may cache information received from base stations for subsequent use if a second user requests a connection via that base station. The information may also be stored in a database as described above.

According to a further aspect, there is provided a method of providing a connection between a user device and a communications network comprising at least one base station and a core network, the method comprising:

transmitting from the base station to the core network security capability information for the base station;

receiving from the core network a selected security policy for the connection between the user device and the base station; and establishing a connection between the user device and the base station using the selected security policy According to a further aspect, there is provided a method of managing security for a connection between a user device and a communications network comprising at least one base station and a core network, the method comprising:

selecting in the core network at least one preferred security policy for a connection between the user device and a base station;

transmitting the at least one preferred security policy to the base station;

receiving information identifying a selected security policy from the base station;

comparing the selected security policy to the at least one preferred security policy; and transmitting a message to the base station if the selected security policy does not match a preferred security policy.

In this aspect, the core network component has a list of acceptable or preferred security policies, which are sent to the base station on receipt of a connection establishment request. This embodiment may advantageously be implemented without the requirement for any new, additional, messages to be transmitted between the base station and core network. Further, the core network does not have to store any security capability information for network components.

In one embodiment, the method further includes obtaining security policy information for the core network prior to selecting at least one preferred security policy.

Preferably, a connection is established between the user device and the base station if the selected security policy matches a preferred security policy. The message may indicate that the base station should not establish the connection if the selected security policy does not match a preferred security policy.

In one embodiment, the message indicates that the base station should not establish the connection. Hence the connection is not established if the selected security policy does not match a preferred security policy. Alternatively, the base station may be given a further opportunity to select an acceptable security policy.

According to a further aspect, there is provided a method of providing a connection between a user device and a communications network comprising at least one base station and a core network, the method comprising:

receiving at the base station at least one preferred security policy for a connection between the user device and the base station;

selecting a security policy for the connection;

transmitting the selected security policy to the core network; and receiving at the base station a message from the core network, if the selected security policy does not match a preferred security policy Aspects of the invention are set out in the independent claims. Preferred features of the aspects are set out in the dependent claims. The invention provides, for all methods disclosed, corresponding computer programs or computer program products for execution on corresponding equipment, the equipment itself (user equipment, nodes, networks or components thereof, including gateway and base station nodes for carrying out the methods described) and methods of configuring and updating the equipment. Features of one aspect may be applied to other aspects.

BRIEF DESCRIPTION OF THE DRAWINGS

Embodiments of the method and system claimed herein will now be described, by way of example, with reference to the accompanying drawings in which:

BEST MODE FOR CARRYING OUT THE INVENTION

Overview

The following description sets out a number of specific embodiments of the method and system claimed herein. It will be clear to one skilled in the art that variations of the features and method steps may be provided and that many of the features described are not essential to the invention.

Figure 1:
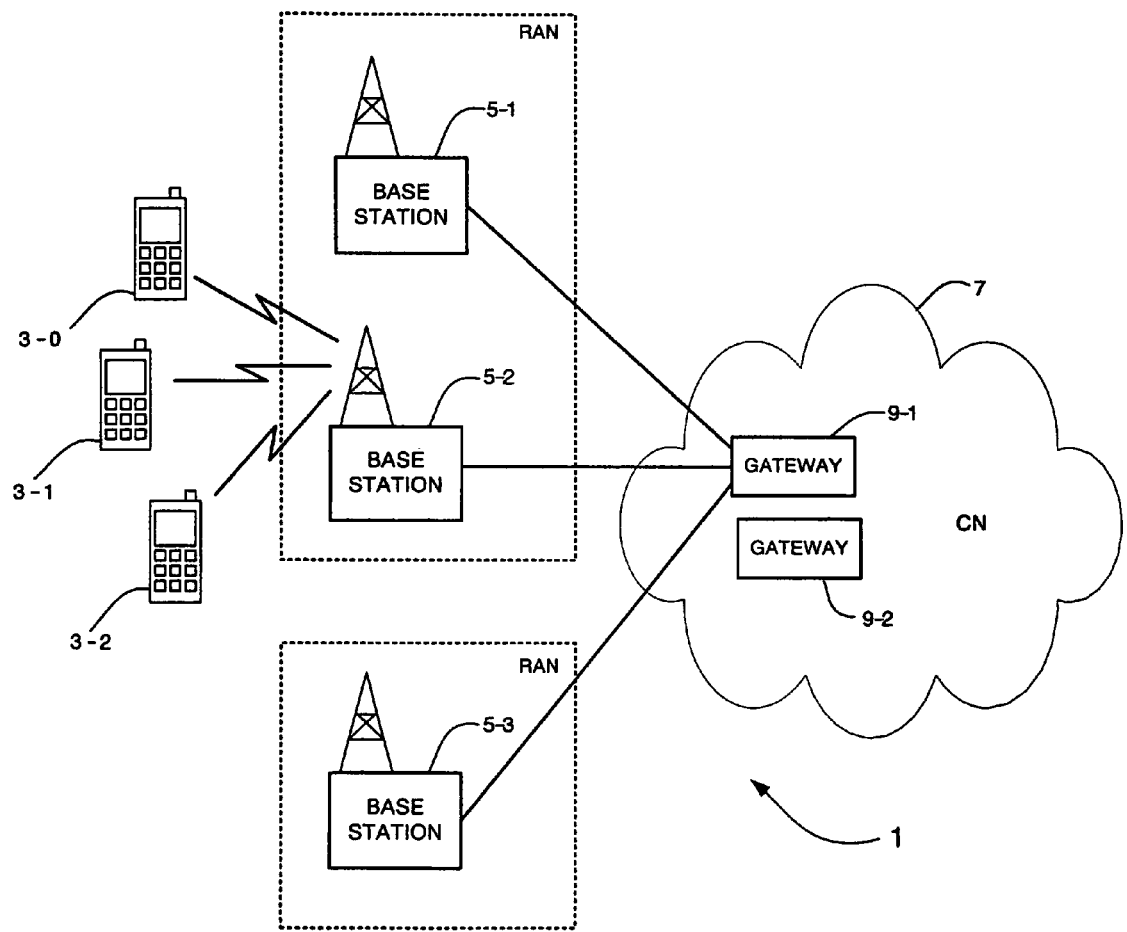
FIG. 1 schematically illustrates a mobile telecommunication system of a type to which the embodiment is applicable.

FIG. 1 schematically illustrates a mobile (cellular) telecommunication system 1 in which users of mobile (or cellular) telephones (MT) 3-0, 3-1, and 3-2 can communicate with other users (not shown) via one of the base stations 5-1, 5-2 or 5-3 and a telephone network 7. The telephone network 7 includes a plurality of components including gateway components 9-1, 9-2. It will be appreciated by the skilled person that the each base station 5-1, 5-2, 5-3 may connect to the telephone network 7 via either gateway 9-1, 9-2 and that all base stations 5-1, 5-2, 5-3 may connect via the same gateway 9-1, 9-2. Similarly, each mobile telephone 3 may connect to the telephone network 7 via either base station 5 and that all mobile telephones 3 may connect via the same base station 5. One or more base stations 5 may be arranged into a Radio Access Network (RAN), controlled by a Radio Network Controller (RNC), which may be implemented as part of a base station 5 in the RAN or as a separate component (not shown).

When a mobile telephone 3 enters the network 7, for example by being switched on, a connection is established between the mobile telephone 3 and a base station 5 and between the base station 5 and a gateway device 9. This enables communication between the mobile telephone 3 and other components in the network 7.

Also, when a mobile telephone 3 moves from the cell of a source base station (e.g. base station 5-1) to a target base station (e.g. base station 5-2), a handover procedure (protocol) is carried out in the source and target base stations 5 and in the mobile telephone 3, to control the handover process. The handover is enabled by the establishment of a connection between the source and target base stations 5. As part of the handover process, the gateway device 9-1, 9-2 via which communications from a mobile telephone 3 are transmitted to the telephone network may change. Alternatively, the gateway device 9-1, 9-2 through which communications are transmitted may remain the same, but the base station 5-1, 5-2 to which the mobile device is connection may change. These transfers are also enabled by the establishment of connections between the base stations 5 and the gateways 9.

Base Station

Figure 2:
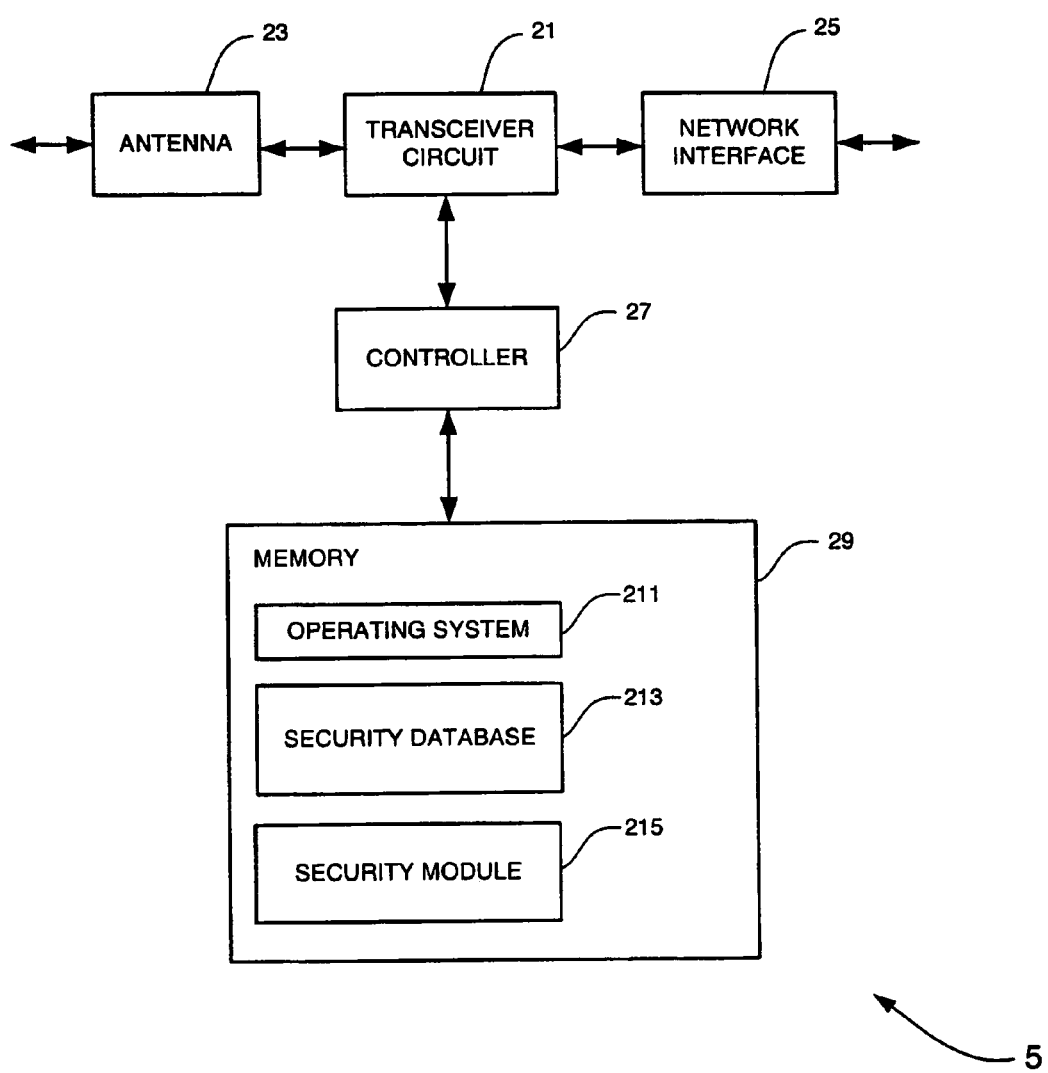
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. The network interface 25 includes an S1 network interface for communicating with network components, such as gateways 9, using the S1 protocol. The network interface 25 also includes an X2 interface for communicating with other base station components using the X2 protocol. A controller 27 controls the operation of the transceiver circuit 21 in accordance with software stored in memory 29. The software includes, among other things, an operating system 211, a security database 213 for storing information relating to the security capabilities of the base station and a security module 215 for communicating information relating to the security capabilities to other network components. The operation of the security database 213 and the security module 215 are described below.

Gateway

Figure 3:
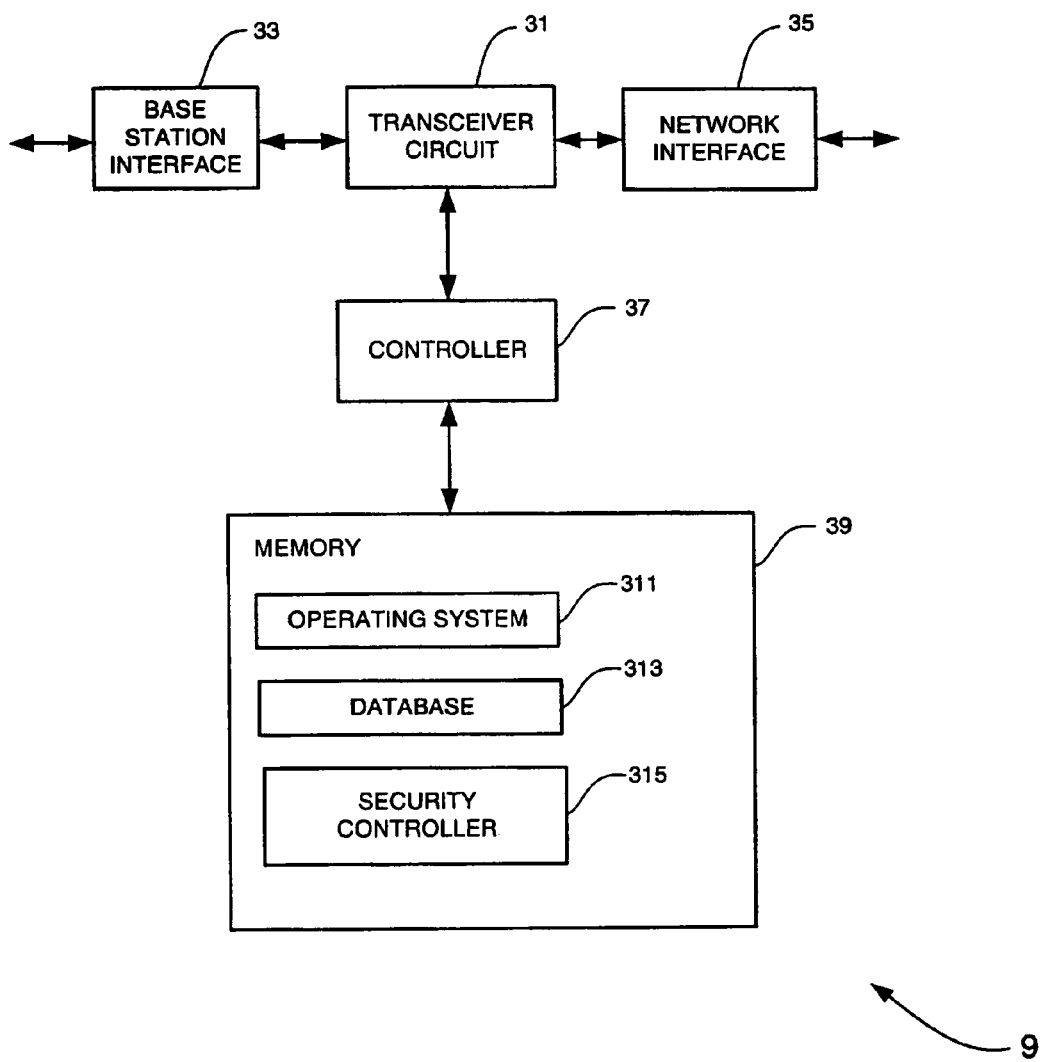
FIG. 3 schematically illustrates a gateway device forming part of the system shown in FIG. 1.

FIG. 3 is a block diagram illustrating the main components of each of the gateway components 9 used in this embodiment. As shown, each gateway 9 includes a transceiver circuit 31, which is operable to transmit signals to and to receive signals from at least one base station 5 via a base station interface 33 and which is operable to transmit signals to and receive signals from the rest of the telephone network 7 via a network interface 35. A controller 37 controls the operation of the transceiver circuit 31 in accordance with software stored in memory 39. The software includes, among other things, an operating system 311, a database 313 for storing information relating to the security capabilities of network components and a security controller 315 for managing security policies within the network. The operation of the database 313 and the security controller 315 are described below.

In the above description, both the base stations 5 and the gateways 9 are described for ease of understanding as having respective discrete modules which operate according to the methods described herein. Whilst the features may be provided in this way for certain applications, for example where an existing system has been modified to implement the invention, in other applications, for example in systems designed with the inventive features in mind from the outset, these features may be built into the overall operating system or code and so the modules described above may not be discernable as discrete entities.

The following description will use the nomenclature used in the Long Term Evolution (LTE) of UTRAN. Therefore, the mobile telephone 3 will be referred to as a UE, each base station 5 will be referred to as an eNodeB (or eNB) and each gateway component will be referred to as an MME. The protocol entities used in LTE have the same names as those used in UMTS except for the Radio Link Control (RLC) entities which, under LTE, are called the Outer ARQ (Automatic Repeat Request) entities. The Outer ARQ entities of LTE have substantially the same (although not identical) functionality to the RLC entities of UMTS.

The term "dedicated message" as used herein refers to a message sent in respect of a particular UE. The dedicated message includes an identifier of a connection to a particular UE. The term "common message" refers to a message sent between two components in the network, for example between two eNodeBs, that does not relate to a particular connection to a UE and therefore has no UE connection identifier.

Operation

Three implementations of methods for selecting a security algorithm for communication in a communications network will now be described in more detail.

First Implementation

Figure 4:
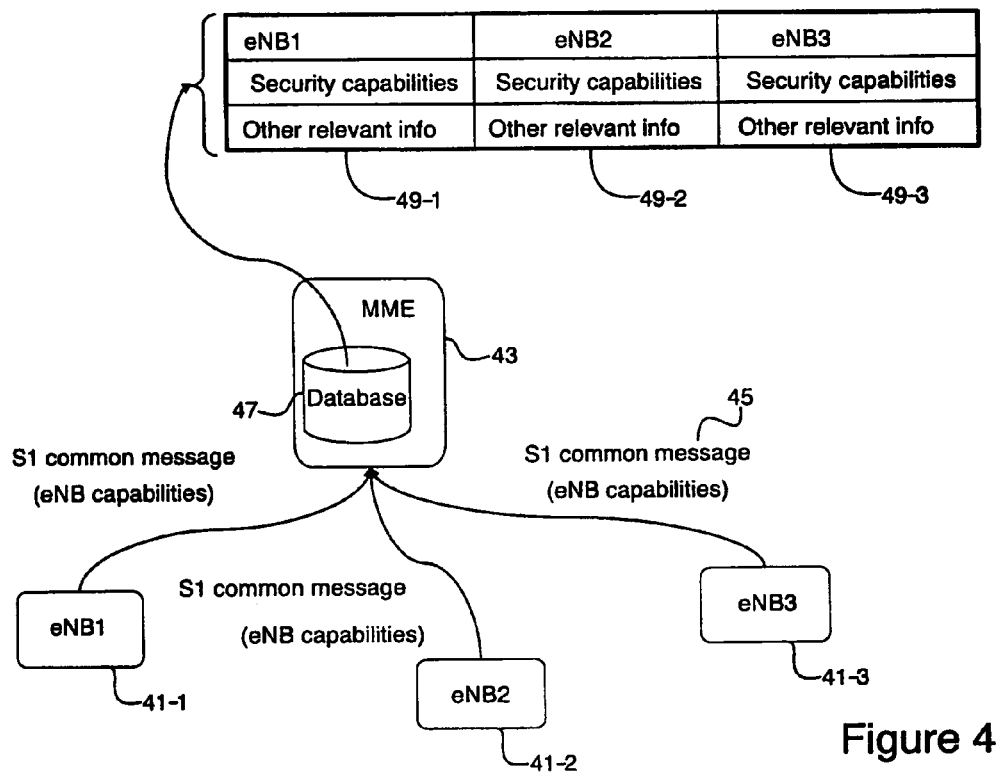
FIG. 4 illustrates a network implementing a security management system according to one embodiment.

A first embodiment will be described with reference to FIG. 4. As illustrated in FIG. 4, multiple eNodeBs 41-1, 41-2, 41-3 are connected to each MME component 43. In this embodiment, each eNodeB signals its security capabilities to the MME 43. This is done using an S1 common message 45 after initialisation of the Stream Control Transmission Protocol SCTP connection. The MME 43 stores in a database 47 an eNodeB context 49-1, 49-2, 49-3 for each eNodeB 41-1, 41-2, 41-3 that is connected to it, containing the security capabilities of the eNodeB. On receipt of an S1 common message 45 from an eNodeB, the MME 43 updates the eNodeB context with the security capability information or creates a new context if one does not already exist for that eNodeB. It is noted that the eNodeB context 49-1, 49-2, 49-3 for each eNodeB may also store other relevant information for the eNodeB, for example the connection status of the eNodeB.

Figure 5:
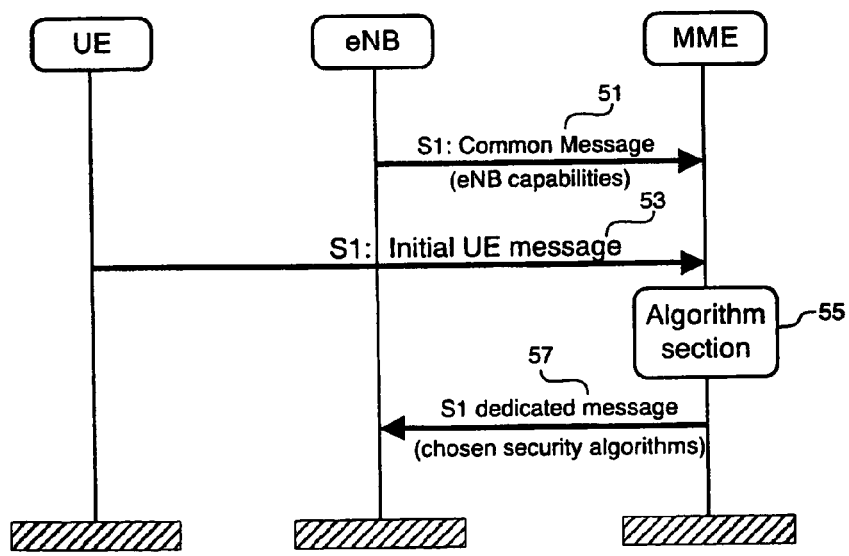
FIG. 5 is a schematic illustration of an attach procedure according to one embodiment.

Further details of an attach procedure according to this embodiment are illustrated in FIG. 5. As described above, each eNodeB signals its security capabilities to the MME using an S1 common message 51 and this is stored in an eNodeB context in the MME. Subsequently, on receipt of a request for attachment of user equipment, for example via an S1: Initial UE message 53, the MME accesses the security context for the eNodeB and determines its security capabilities. The MME selects an algorithm 55 based in part on the eNodeB capabilities and instructs the eNodeB to use the selected algorithm via an S1 dedicated message 57.

Figure 6:
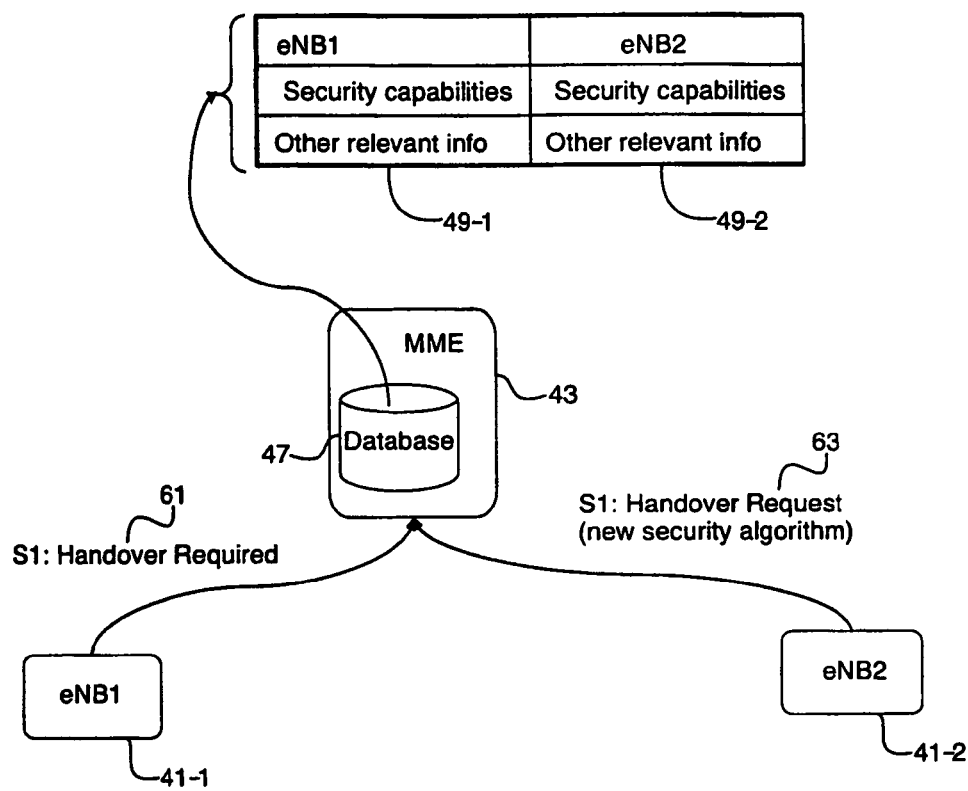
FIG. 6 is a schematic illustration of a handover or relocation procedure according to one embodiment.

A handover procedure will now be described in more detail with reference to FIG. 6. As a UE transfers away from an eNodeB 41-1, the eNodeB sends an S1: HandoverRequired message 61 to the MME 43. The MME 43 determines the target eNodeB 41-2 to which the UE is transferring. Since the MME 43 has already stored in its database 47 a context for each eNodeB 49-1, 49-2 identifying the security capabilities of each eNodeB, the MME 43 can determine whether a change in the security algorithm is required by the transfer. If so, the MME 43 informs the target eNodeB 41-2 of the new security algorithm when it sends the S1: Handover Request message 63 to the target eNodeB. The new security algorithm may or may not be the same as the security algorithm used for the source eNodeB.

Second Implementation

Figure 7:
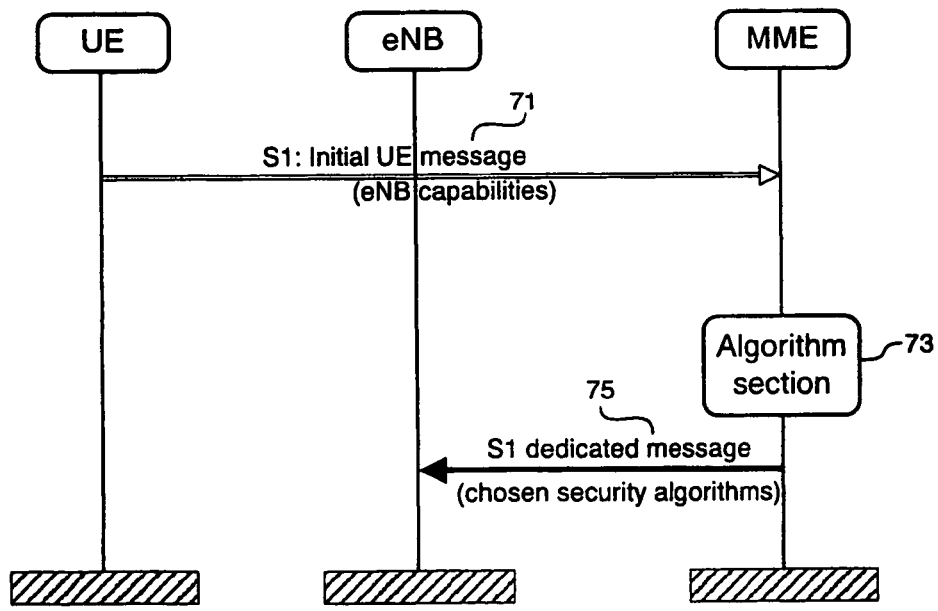
FIG. 7 is a schematic illustration of an attach procedure according to a further embodiment.

In a second embodiment, the eNodeB security capabilities are sent to the MME as part of the UE attach or handover procedure. An attach procedure according to this embodiment is illustrated in FIG. 7.

As part of the attach procedure, a UE sends an S1: Initial UE message 71 via an eNodeB to an MME. On forwarding this Initial UE message 71, the eNodeB incorporates information relating to its own security capabilities and transmits this as part of the S1: Initial UE message 71 to the MME. On receipt of the message, the MME selects the security algorithm 73 for the connection and informs the eNodeB using an S1 dedicated message 75.

Figure 8:
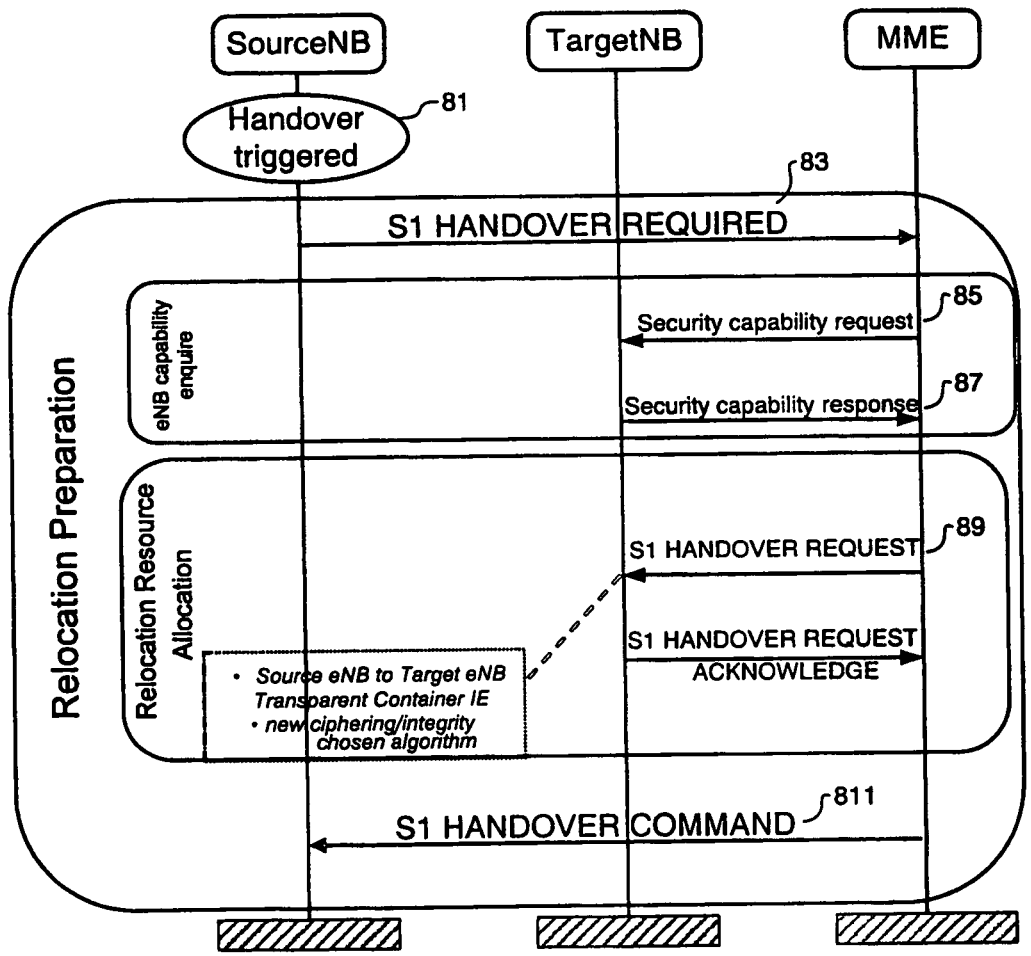
FIG. 8 is a schematic illustration of a handover or relocation procedure according to a further embodiment.

A handover method according to the present embodiment will now be described with reference to FIG. 8. When a handover is triggered 81, the source eNodeB sends an S1: Handover Required message 83 message to the MME. To determine whether a change in the security algorithm is needed, the MME needs to know the security capabilities of the target eNodeB. This is achieved using a separate S1: Security capability Request/Response procedure 85, which may be implemented either as a dedicated procedure for a particular UE connection, or as a common procedure.

Once the security capabilities of the target eNodeB have been determined, an S1: Handover Request message 87 is sent from the MME to the target eNodeB, the message advising the target eNodeB of the security algorithm that has been selected. The handover request is acknowledged 89 by the target eNodeB and the MME issues an S1: Handover Command 811 to the source eNodeB.

Third Implementation

Figure 9:
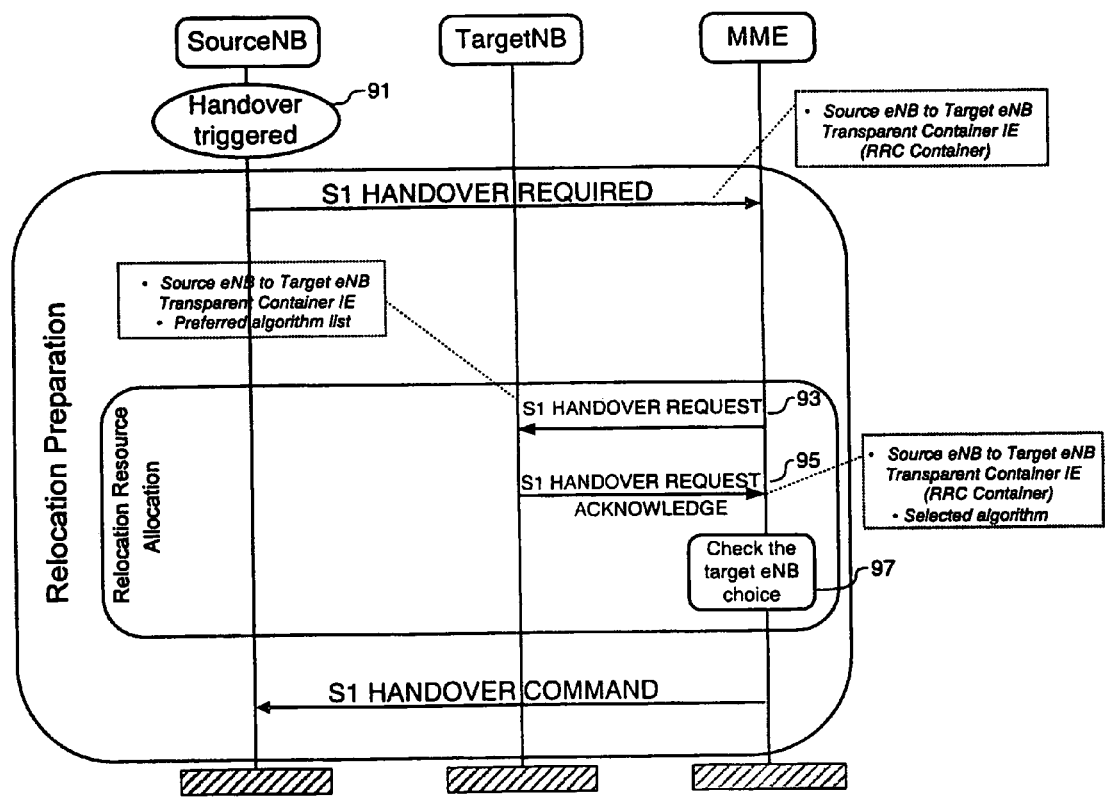
FIG. 9 is a schematic illustration of a handover or relocation procedure according to a further embodiment.

A third embodiment of the system and method described herein is illustrated in FIG. 9.

In this embodiment, the attach procedure operates in the same way as already described for the second embodiment and illustrated in FIG. 7. That is, the security capabilities are forwarded to the MME using a dedicated S1: Initial UE message.

An S1 relocation or handover procedure is illustrated in FIG. 9. In this embodiment, when handover is triggered 91, the MME sends an S1: Handover Request message 93 to the target eNodeB. The S1: Handover Request message 93 incorporates a list of preferred security algorithms. The target eNodeB selects one algorithm from the list and informs the MME of its selection in the S1: Handover Request Acknowledge message 95.

The MME checks the target eNodeB choice 97 and will then have the authority to reject the target eNodeB decision if it selects an algorithm not belonging to the preferred list. If the algorithm is rejected, the MME will send a Resource Release message to the target eNodeB and reject the handover to the source eNodeB.

If the MME accepts the algorithm choice of the eNodeB, the connection is established between the eNodeB and the user device in accordance with the usual procedures.

GLOSSARY OF 3GPP TERMS

LTE—Long Term Evolution (of UTRAN)
eNodeB—E-UTRAN Node B
AGW—Access Gateway
UE—User Equipment—mobile communication device
DL—downlink—link from base to mobile
UL—uplink—link from mobile to base
AM—Acknowledge Mode
UM—Unacknowledge Mode
MME—Mobility Management Entity
UPE—User Plane Entity
CN—Core Network
HO—Handover
RAN—Radio Access Network
RANAP—Radio Access Network Application Protocol
RLC—Radio Link Control
RNC—Radio Network Controller
RRC—Radio Resource Control
RRM—Radio Resource Management
SDU—Service Data Unit
SRNC—Serving Radio Network Controller
PDU—Protocol Data Unit
NAS—Non Access Stratum
ROHC—Robust Header Compression
TA—Tracking Area
U-plane or UP—User Plane
TNL—Transport Network Layer
S1 Interface—Interface between Access Gateway and eNodeB
X2 Interface—Interface between two eNodeBs
MMEs/SAE Gateway—Access Gateway having both MME and UPE entities The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Title: Signalling of eNB Security Capabilities

1 INTRODUCTION

It is safer if MME selects the security algorithms for NAS, RRC and UP traffic probably because the Home eNB cannot be entrusted with security algorithm selection. As a consequence the MME needs to know the eNB security capabilities by the time the algorithm selection is made. This document proposes three possible ways to allow the MME to perform the algorithm selection during the Attach procedure and, if required, also during the S1 Relocation.

2 BACKGROUND

UMTS Background

In UMTS, the SRNC would select the security algorithm on the base of its security capabilities, UE security capability and the allowed Algorithm information coming from the CN.

During the SRNS Relocation, the TRNC would, if needed, choose another algorithm depending on its capabilities (stored in its database), the current algorithm being used (information given from the source RNC) and the allowed security algorithms (information given by the CN in the RANAP: Relocation Request).

Proposals

MME will select the security algorithms for NAS, RRC and UP traffic.

RAN2 and RAN3 should provide MME with the necessary information

The security algorithm selection takes place during the following procedures:

Attach procedure;

Inter eNB Handover, either via X2 or S1.

3 PROPOSALS

Following, three proposals are listed for the security algorithm selection.

3.1 Proposal 1

The proposal focuses on the signalling mechanism of the eNB security capability to the MME, storage of these security capabilities in the eNB context within MME and query of the eNB context during the Attach and S1 Relocation procedures in order to decide the security algorithm.

3.1.1 Signalling Mechanism

In order for the MME to be able to select the security algorithm during both Attach and S1 Relocation procedures, it is required that:

Every eNB which is S1 connected with the MME signal its security capabilities to the MME MME keep an eNB context, containing the eNB securities capabilities, which will then be queried during both Attach and S1 Relocation procedures.

3.1.1.1 eNB Context Updating in the MME

After the initialization of the SCTP connection, the eNB inform the MME on its security capabilities by an S1 common message. The MME will then update the eNB context and stores its capability information.

3.1.1.2 Attach Procedure

At the reception of the S1: Initial UE message, the MME will select the security algorithm according to the UE capabilities, the eNB capabilities stored in the eNB Context, within the MME, and the allowed RRC/UP security algorithms also known to the MME.

The chosen algorithm will then be informed to the eNB by a proper S1 message.

3.1.1.3 S1 Relocation Procedure

At the reception of the S1: Relocation Required, the MME should be able to evaluate whether an algorithm change is required and if so it should inform the target eNB on the new algorithm in the S1: Relocation Request message.

In order for the MME to be able to select a new algorithm during the S1 relocation procedure, the maintenance of the eNB context as proposed above, is necessary.

3.2 Proposal 2

The eNB security capabilities are sent to the MME by means of following S1 messages i.e.:

S1 Initial UE message during Attach procedure

New S1 procedure during the S1 Relocation (either common or dedicated)

3.2.1.1 Attach Procedure

The MME receives the eNB capabilities in the S1: Initial UE message, it will select the security algorithm and inform the eNB by dedicated S1 message.

3.2.1.2 S1 Relocation

The MME, by the time it receives the S1 Relocation Required, it has to decide whether an algorithm change is needed i.e. it needs to know the target eNB capabilities. MME gets to know the target eNB capabilities by means of the new S1: Security capability Request/Response procedure. This procedure may either be a dedicated procedure or a common procedure.

3.3 Proposal 3

During the Attach procedure the MME would get the security capabilities by dedicated S1 message i.e. S1: Initial UE message (same as proposal 2).

During the S1 Relocation, the MME inform the target eNB on a preferred list of security Algorithms; the eNB will select one algorithm and inform the MME about it in the S1: Relocation Request acknowledge.

The MME will then have the authority to reject the target eNB decision if it selects an algorithm not belonging to the preferred list. Subsequently, the MME will:

Order the release resource to the target eNB;

Reject the Handover to the source eNB.

3.4 Proposals Comparison

Proposal 1—Provides minimum signalling overhead, but the MME needs to maintain the security information within the eNodeB context.

Proposal 2—The MME does not need to maintain the eNodeB context, but the proposal has an associated signalling overhead since UE dedicated messages are used to signal the eNodeB capabilities and there is a delay in the handover preparation procedure.

Proposal 3—Requires no new message and the MME does not need to maintain the eNodeB context. Handover procedure may fail after target eNodeB allocates the resources. This would be an abnormal case e.g. the target eNodeB is not a trusted eNodeB (i.e. eNodeB not under the operator control).

4 CONCLUSION

We propose three possible ways to let the MME change the security algorithms during both Attach and S1 Relocation procedures. Comparing the proposals listed in table 1, our preference is to agree in proposal 1 if anyway an eNB context needs to be maintained for any other reason, otherwise we think proposal 3 is the simplest solution. It is proposed that RAN 3 discusses and agrees to capture the preferred mechanism in Stage 2 specifications.

This application is based upon and claims the benefit of priority from United Kingdom Patent Application No. 0721337.4, filed on Oct. 31, 2007, the disclosure of which is incorporated herein in its entirety by reference.

The invention claimed is:

1. A method of managing security for a connection between a user device and an Long Term Evolution (LTE) communications network comprising at least one Evolved Universal Terrestrial Radio Access Network (E-UTRAN) base station and a core network, the method comprising:

receiving, at the core network, security capability information for the user device connecting to the communications network;

obtaining security capability information for one base station of the at least one base stations;

processing, at the core network, the security capability information for the user device and the security capability information for the base station to select a plurality of preferred security policies for a connection between the user device and the base station; and transmitting the selected plurality of preferred security policies to the base station as a list of preferred security policies from which said base station can select a security policy, wherein the selected security policy relates to at least one of a Radio Resource Control (RRC), a User Plane (UP), and a Non-Access Stratum (NAS) security algorithm selection.

2. A method according to claim 1, further comprising:
obtaining security policy information for the core network; and
selecting a security policy for a connection between the user device and the base station based on the security policy information for the core network.

3. A method according to claim 2, wherein the security policy information for the core network comprises at least one preferred security policy.

4. A method according to claim 2, wherein the security policy information comprises a prioritized list of security policies.

5. A method according to claim 1, wherein the list of preferred security policies comprises a prioritized list of security policies.

6. A method according to claim 1, further comprising, prior to said receiving said security capability information for the user device, receiving security capability information for each of a plurality of base stations in the communications network at the core network.

7. A method according to claim 1, further comprising storing the security capability information for each base station in the core network.

8. A method according to claim 7, wherein said storing the security capability information comprises storing security capability information in a context associated with the base station.

9. A method according to claim 1, wherein said obtaining said security capability information for the base station comprises retrieving security capability information from a memory.

10. A method according to claim 1, further comprising receiving security capability information for a base station following establishment of a connection between the base station and the core network.

11. A method according to claim 1, wherein the security capability information is received in an S1 common message.

12. A method according to claim 1, further comprising receiving security capability information for the base station and updating a database to store the security capability information.

13. A method according to claim 1, further comprising selecting the plurality of preferred security policies upon reception of a request for attachment from the user device.

14. A method according to claim 1, further comprising transmitting the selected plurality of preferred security policies to the base station using an S1 dedicated message.

15. A method according to claim 1, further comprising:
receiving a notification regarding a transfer of the user device from a source base station to a target base station;
obtaining security capability information for the target base station;

determining whether a change in the plurality of preferred security policies is required for connection to the target base station; and transmitting the selected plurality of preferred security policies to the target base station.

16. A method according to claim 15 wherein said determining whether the change in the plurality of preferred security policies is required for connection to the target base station comprises retrieving stored security capability information for the target base station.

17. A method according to claim 15, wherein said determining whether said change in the plurality of preferred security policies is required for connection to the target base station comprises transmitting a request for security capability information to the target base station.

18. A method according to claim 1 wherein said obtaining said security capability information for the base station comprises receiving security capability information from the base station.

19. A method according to claim 18, wherein the security capability information is received as part of an attachment request message.

20. A method according to claim 1, wherein the core network comprises at least one gateway component.

21. A method according to claim 1, wherein said selecting the plurality of preferred security policies comprises assessing security capability information and security policy information for the core network.

22. A gateway for managing security for a connection between a user device and an Long Term Evolution (LTE) communications network comprising at least one Evolved Universal Terrestrial Radio Access Network (E-UTRAN) base station and a core network, the gateway comprising:

a receiving unit configured to receive security capability information for the user device connecting to the communications network;

an obtaining unit configured to obtain security capability information for a base station of the at least one base stations;

a processing unit configured to process the security capability information for the user device and the security capability information for the base station to select a plurality of preferred security policies for a connection between the user device and the base station; and a transmitting unit configured to transmit the plurality of preferred selected security policies to the base station as a list of preferred security policies from which said base station can select a security policy, wherein the selected plurality of preferred security policies relates to at least one of a Radio Resource Control (RRC), a User Plane (UP), and a Non-Access Stratum (NAS) security algorithm selection.

23. A gateway according to claim 22, further comprising a receiving unit configured to receive security capability information for each of the base stations in the communications network.

24. A gateway according to claim 22, further comprising a storing unit configured to store the security capability information for the at least one base station in the core network.

25. A gateway according to claim 22, wherein the obtaining unit is configured to receive security capability information from memory.

26. A gateway according to claim 22, wherein the obtaining unit is configured to receive security capability information from the base station.

27. An Evolved Universal Terrestrial Radio Access Network (E-UTRAN) gateway for managing security for a connection between a user device and a communications network comprising at least one base station and a core network, the gateway comprising:

a receiver for receiving security capability information for the user device connecting to the communications network;

a device for obtaining security capability information for the base station;

a processor for processing the security capability information for the user device and the security capability information for the base station to select a plurality of preferred security policies for a connection between a user device and the base station; and a transmitter for transmitting the selected plurality of preferred security to the base station as a list of preferred security policies from which said base station can select a security policy, wherein the selected security policy relates to at least one of a Radio Resource Control (RRC), a User Plane (UP), and a Non-Access Stratum (NAS) security algorithm selection.

28. A non-transitory, machine readable, storage medium tangibly embodying a program of machine-readable instructions executable by a digital processing apparatus to perform a method according to claim 1.

29. A user device for connecting to a Long Term Evolution (LTE) communications network comprising at least one Evolved Universal Terrestrial Radio Access Network (E-UTRAN) base station and a core network, the user device comprising:

a transmitter for transmitting security capability information for the user device to the core network; and a connection unit configured to establish a connection to the base station using a selected security policy;

wherein the selected security policy is selected by the base station, from a preferred list of security policies comprising a plurality of preferred security policies selected by the core network based on the security capability information for the user device and security capability information for the base station; and wherein the selected security policy relates to at least one of Radio Resource Control (RRC), User Plane (UP) and Non-Access Stratum (NAS) security algorithm selection.

30. A method performed by a user device for connecting to a Long Term Evolution (LTE) communications network comprising at least one Evolved Universal Terrestrial Radio Access Network (E-UTRAN) base station and a core network, the method comprising:

transmitting security capability information for the user device to the core network; and establishing a connection to the base station using a selected security policy;

wherein the selected security policy is selected by the base station, from a preferred list of security policies comprising a plurality of preferred security policies selected by the core network based on the security capability information for the user device and security capability information for the base station; and wherein the selected security policy relates to at least one of Radio Resource Control (RRC), User Plane (UP) and Non-Access Stratum (NAS) security algorithm selection.

* * * * *